March 24, 1959
T. ELLIOTT
2,878,626
TOOL JOINT AND VALVE SEAT GRINDER
Filed Aug. 7, 1956
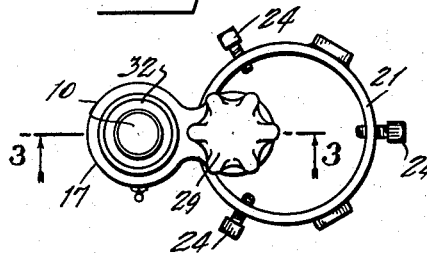
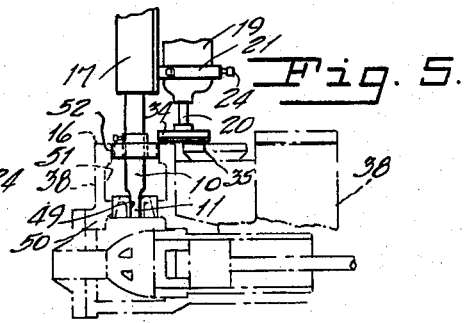
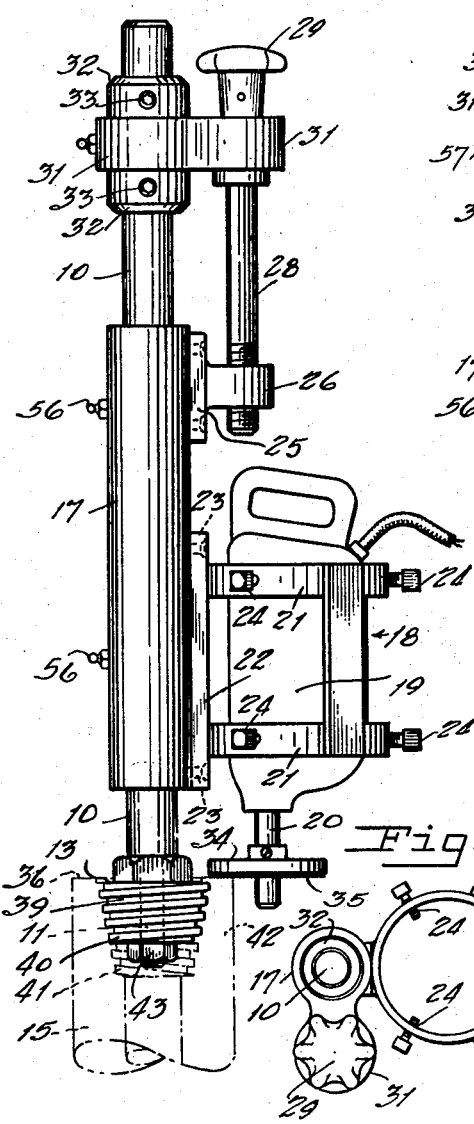
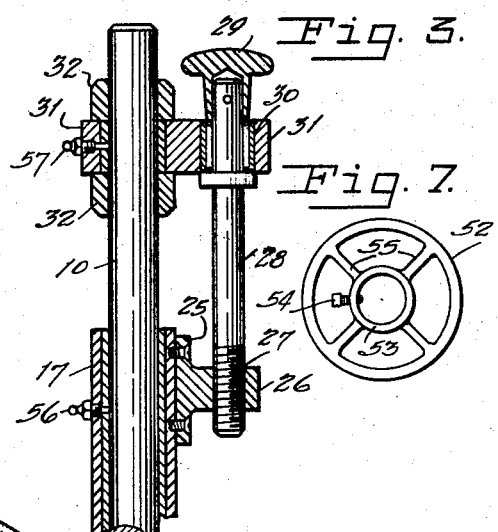
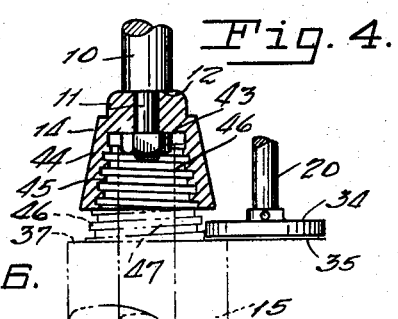
Thomas Elliott
INVENTOR.
BY *Cecil L. Hood*
ATTORNEY.

United States Patent Office 2,878,626
Patented Mar. 24, 1959

2,878,626

TOOL JOINT AND VALVE SEAT GRINDER

Thomas Elliott, Odessa, Tex.

Application August 7, 1956, Serial No. 602,671

3 Claims. (Cl. 51—241)

This invention relates to tool grinding and finishing apparatus, and more particularly to devices for grinding tool joints for drill pipe, drilling subs, and the like, and valve seats for slush or mud pumps for pumping drilling fluids, and the principal object of the invention resides in the provision of a device for supporting a grinding tool adapted for adjustment and alignment with respect to the surfaces to be ground.

An object of the invention resides in the provision of apparatus by which an electrically operated grinder can be detachably supported and adjusted to engage the seating surfaces of the pin or box ends of drill pipe sections, or the seating surfaces of valve heads in pumps, such as those of pumps especially designed for pumping drilling fluids used in drilling oil and water wells, commonly referred to as slush or mud pumps.

A prime object of the invention is that of providing a simple and inexpensive mechanism by which a conventional rotary grinding tool can be detachably supported and adjustably directed or impelled against the work to accurately surface the same with respect to a central axis to insure a proper and accurate seal for a joint or gasket.

A still further object of the invention resides in the provision of a grinder guide by which the grinding tool can be aligned with the central axis of the drill stem sections or pump valve seat to insure a simple but completely accurate application of the tool to the work to be accomplished and by which the abrasives can be urged or impelled against the surfaces in such micromatic adjustments as to insure a perfect sealing engagement between opposing surfaces, such as between the sections of drill tool joints, and the like.

Broadly, the invention contemplates the provision of a portable tool for grinding or finishing surfaces for the purpose of sealing against leakage whereby such surfaces can be processed at their locale, as in the oil field, without requiring the use of expensive shop equipment, transportation, and other expensive items, tending to increase costs of reconditioning such devices.

While the foregoing objects are paramount, other and lesser objects will become manifest as the description proceeds, taken in connection with the appended drawings, wherein:

Figure 1 is an elevational view of the invention supporting a conventional grinding tool and attached to the box end of a section of drill stem, the latter being fragmentarily shown in broken lines.

Figure 2 is a plan view of the invention showing the circular cage for supporting the grinding tool.

Figure 3 fragmentarily illustrates, in partial section, the adjusting device for the grinding tool with respect to the ground surfaces.

Figure 4 fragmentarily illustrates in partial section, the adaptor for the device in attaching the same to the pin of a drill stem section, the latter being fragmentarily shown in broken lines.

Figure 5 fragmentarily and schematically illustrates the invention applied to a slush pump for grinding the valve head thereof, the pump being shown in broken lines.

Figure 6 illustrates, in plan, a modification of the invention in which the tool-holding device is arranged at right-angles to the adjusting screw, and Figure 7 is a plan view of the guide collar for the invention in operations on pump valves, as used in Figure 5.

The invention is especially designed for accomplishing grinding operations on sections of drill pipe or stem in the field, or at some locale remote from such stationary equipment as lathes, and the like, and for grinding seating surfaces about heads of valve seats in oil field pumps. The device is simple and light in structure and is readily portable.

It is important that the joints between the drill pipe sections of a drill stem be closely fitted to avoid leakage of drilling fluids, and at intervals the joining surfaces must be dressed or smoothed to insure a proper junction. In handling the sections it often occurs that these joining surfaces are damaged or scarred so that a seal cannot be accomplished between connected sections. Likewise, it is frequently necessary to dress or smooth the valve head seats enclosing the valves of oil field pumps, generally referred to as slush pumps, which become impaired due to wear and erosion caused by abrasives in the drilling fluids moved therethrough.

In its preferred form the invention comprises a shaft 10 having a pin 11 formed on its operative end which is threaded, as shown in Figure 4, the pin 11 defining a shoulder 12 against which an adaptor 13 or 14 is seated, as in Figures 1 and 4, by which the invention can be attached axially of a drill pipe section 15, shown in broken lines in Figures 1 and 4, or to a pump valve seat head 16, shown in broken lines in Figure 5.

The shaft 10 has a sleeve 17 concentrically thereof and slidable thereon, as illustrated in Figures 1 and 3, and this member has a cage 18 secured thereto for supporting a grinding tool 19 so that its rotating shaft 20 is parallel to the shaft 10. The cage 18 comprises a pair of spaced concentrically aligned bands 21 integrally attached to a plate 22 secured by screws 23, or other device, to the sleeve 17 and in longitudinal alignment therewith. Each of the bands 21 has a plurality of set screws 24 spaced thereabout by which the the grinding tool 19 is retained after proper rotative adjustment with respect to the sleeve 17, as will be presently described.

At the opposite end of the sleeve 17 is secured a bracket 25 having a lug 26 integral therewith which has an internally threaded bore 27, as best illustrated in Figure 3, wherein is threaded a feed screw 28 by which the sleeve 17, with the cage 18, can be gradually moved along the shaft 10 when the screw 28 is rotated by a knob 29 attached to its outer end which is journalled in a bearing 30 seated in a bracket 31 rotatable about the shaft 10 near its outer end, as shown in Figures 1 and 3. The bracket 31 is adjustably supported on the shaft 10 between a pair of collars 32 secured by set screws 33.

In Figures 1 and 2 the brackets 25 and 31 are shown extending from the shaft 10 in axial alignment with the plate 22 supporting the cage 18. However, in some instances such an arrangement would interfere with the installation of the grinding tool 19 in the cage 18. It is therefore desirable to offset the brackets 25 and 31 in the manner shown in Figure 6 whereby the cage 18 is free to receive the grinding tool 19, the latter being of conventional design, and having a discular plate 34 mounted on its shaft 20 and an abrasive disk 35 applied to the latter.

As stated, the invention is adapted to use in grinding or finishing the joining surfaces 36 and 37 of the respective pin and box ends of drill pipe sections 15, as shown in Figures 1 and 4, or applied to a valve seat head 16 of a pump 38, shown in Figure 5. A special adaptor 39, having tapered threads 40 thereon matching the internal threads 41 of the box 42 of a pipe section 15, is attached to the pin 11 of the shaft 10 and secured thereon by a nut 43. By this arrangement the shaft 10 can be accurately aligned axially of the pipe section 15.

An adaptor 44 is provided for threaded securement to the pin end of the pipe section 15, as shown in Figure 4, and comprises a bell-shaped member having internal tapered threads 45 engaging the external threads 46 of the pin 47, the adaptor 44 being secured to the pin 11 of the shaft by the nut 43.

When the device is employed to grind the seat heads 16 of valves, as exemplified in Figure 5, the pin 11 of the shaft 10 is inserted into the central opening 49 of a conventional valve guide 50 to center the shaft 10 in the valve chamber 51 and a circular collar member 52, shown in Figure 7, is employed as a guide within the valve chamber 51. The collar member 52 is designed to snugly fit into the top of the valve chamber 51 and has a central sleeve 53 slidable on the shaft 10 and adjustably fixed thereon by a set screw 54, the sleeve 53 being integrally connected to the collar member 52 by spokes 55.

In operation, therefore, the grinding tool 19 is arranged in the cage 18 and secured by the set screws 24 for rigidity, after being oriented to the proper position to cause the discular plate 34 and its abrasive disk 35 to assume the desired grinding position on the surfaces 36 and 37, or the valve seat head 16, shown in Figure 5. The grinding tool 19 is then capable of being adjusted with respect to the surface to be treated by moving the sleeve 17 longitudinally of the shaft 10 by the feeding screw 28 by rotating the same by its knob 29. It will be observed, by reference to Figures 1 and 3, that the sleeve 17 has a plurality of grease fittings 56 therein by which the shaft 10 can be lubricated. The bracket 31 also has a grease fitting 57 therein for proper lubrication on the shaft 10 and provide for free rotation of the sleeve 17 and the bracket 31 about the surfaces to be ground.

The collars 32 on the shaft 10, by which the bracket 31 is adjustably supported, are movable to adapt the device to different types of work, or when a different type of grinding tool 19 is employed. Such an arrangement is merely for convenience. Obviously the invention is flexible and adaptable to a variety of applications for the purposes for which it is designed. The feed screw 28 is preferably provided with relatively fine threads to insure a micromatic adjustment thereof in projecting the abrasive disk 35 against the surfaces 36 and 37.

The structure, as described in considerable detail, is subject to certain changes in design and operation, and such changes or modifications that may be considered as falling within the spirit of the invention may also be considered as falling within the scope of the appended claims.

What is claimed is:

1. In combination with a portable grinding tool comprising a motor having an abrasive disc connected directly to its shaft, means for mounting said tool on an end face of a section of drill pipe comprising a shaft having a threaded adapted member connected to one of its ends for engagement with a corresponding threaded end portion of the drill pipe section whereby the shaft is connected to the drill pipe section, in alignment therewith, a sleeve journaled on the shaft and movable longitudinally relative thereto, clamping means attached to one side of the sleeve and clamped about the grinding tool whereby the shaft of the motor is arranged parallel to the sleeve, a bracket attached to one side of the sleeve and having a threaded bore therein, a bracket journaled on the end of the shaft opposite the adapter member and positioned between a pair of collars each adjustably connected to the shaft, and a feed screw journaled in a bearing provided therefor in the last mentioned bracket and engaging the threaded bore of the first mentioned bracket, the feed screw having a knob whereby it may be rotated manually to thereby advance and retract the grinding tool relative to the adjacent end of the pipe.

2. In combination with a portable grinding tool comprising a motor having an abrasive disc connected directly to its shaft, means for mounting said tool on a valve seat of a slush pump comprising a shaft having an end portion of reduced diameter forming a shoulder for engagement with a valve guide positioned in the valve chamber below the valve seat, and having a collar of larger diameter adjustably connected thereto for engagement with the inner wall of the valve chamber below the valve seat, whereby the adjacent end of the shaft is securely seated in the valve chamber, in alignment with the valve seat, a sleeve journaled on the shaft and movable longitudinally relative thereto, clamping means attached to one side of the sleeve and clamped about the grinding tool whereby the shaft of the motor is arranged parallel to the sleeve, a bracket attached to one side of the sleeve and having a threaded bore therein, a bracket journaled on the end of the shaft opposite its reduced end portion and positioned between a pair of collars each adjustably connected to the shaft, and a feed screw journaled in a bearing provided therefor in the last mentioned bracket and engaging the threaded bore of the first mentioned bracket, the feed screw having a knob whereby it may be rotated manually to thereby advance and retract the grinding tool relative to the valve seat.

3. In combination with a portable grinding tool comprising a motor having an abrasive disc connected directly to its shaft, means for mounting said tool on the work to be operated upon comprising a shaft having means for rigidly securing it to the work, in alignment therewith, a sleeve journaled on the shaft and movable longitudinally relative thereto, clamping means attached to one side of the sleeve and clamped about the grinding tool whereby the shaft of the motor is arranged parallel to the sleeve, a bracket attached to one side of the sleeve and having a threaded bore therein, a bracket journaled on the end of the shaft opposite the end which is secured to the work, and positioned between a pair of collars each adjustably connected to the shaft, and a feed screw journaled in a bearing provided therefor in the last mentioned bracket and engaging the threaded bore of the first mentioned bracket, the feed screw having a knob whereby it may be rotated manually to thereby advance and retract the grinding tool relative to the work.

References Cited in the file of this patent

UNITED STATES PATENTS

| | | |
|---|---|---|
| 2,238,785 | Walton | Apr. 15, 1941 |
| 2,412,199 | Blood | Dec. 10, 1946 |
| 2,414,731 | Forbes | Jan. 21, 1947 |
| 2,707,358 | Grunder | May 3, 1955 |

FOREIGN PATENTS

| | | |
|---|---|---|
| 631,536 | France | Sept. 17, 1927 |